March 17, 1953  J. CARNESECCA, JR  2,631,369
PORTABLE POWER SHEARS
Filed Oct. 22, 1947  2 SHEETS—SHEET 1
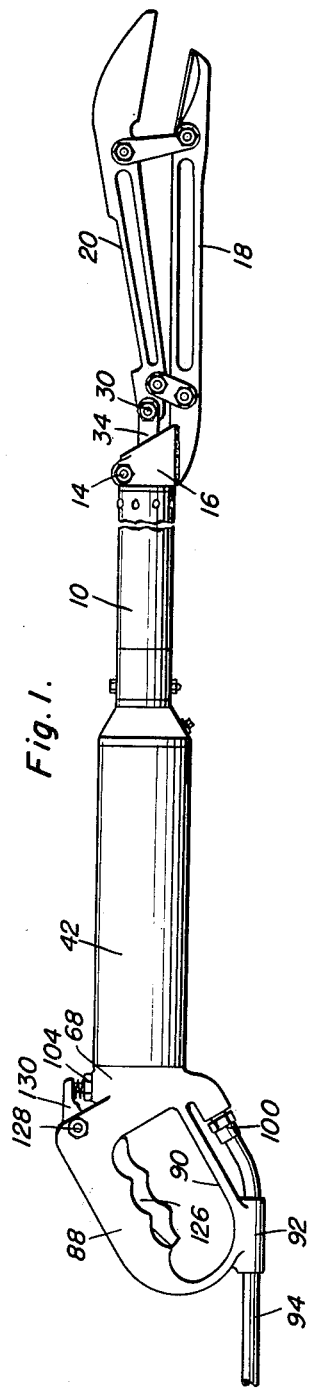
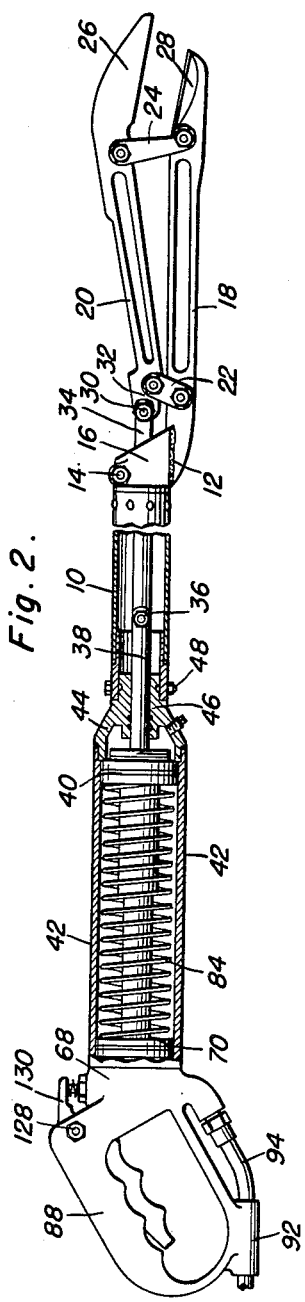
Joseph Carnesecca Jr.
INVENTOR.

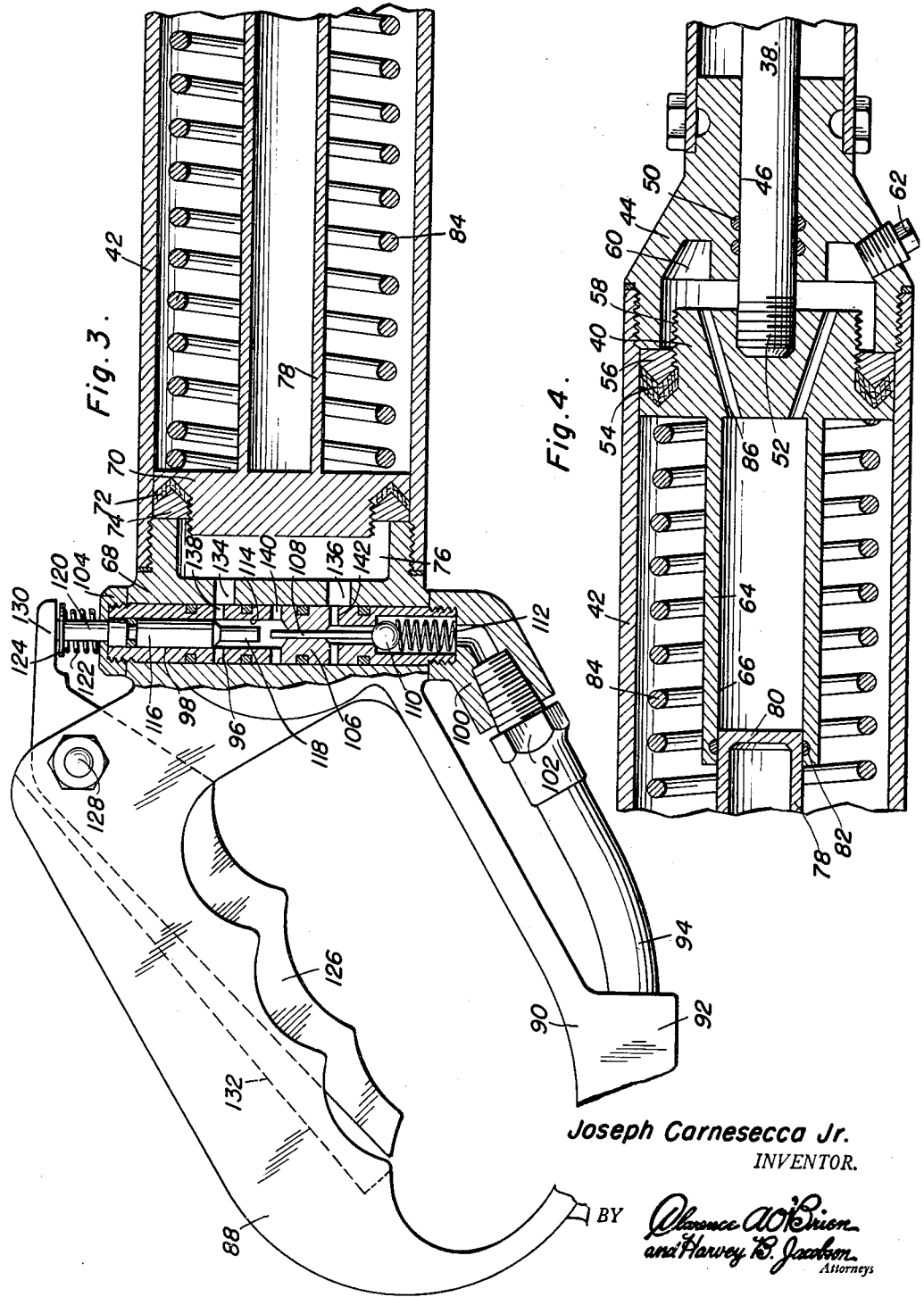

Patented Mar. 17, 1953

2,631,369

UNITED STATES PATENT OFFICE 2,631,369

PORTABLE POWER SHEARS

Joseph Carnesecca, Jr., Springville, Utah

Application October 22, 1947, Serial No. 781,407

13 Claims. (Cl. 30—228)

This invention comprises novel and useful improvements in a portable power shears and more specifically pertains to a portable power operated shears.

The present invention relates to similar subject matter, but constitutes an improvement over the construction set forth in my co-pending application, Serial No. 693,112, filed August 26, 1946, now Patent No. 2,505,385, granted April 25, 1950.

It is a primary object of this invention to provide a power cutting shears for pruning or similar purposes having an improved actuating means for the shear jaws.

An important object of the invention resides in providing a power shear in accordance with the foregoing objects wherein the parts of the device may be readily assembled and detached at will.

Another object of the invention relates to the construction of a pruning shear, in accordance with the foregoing objects, which may be readily operated from a convenient power source such as a fluid pressure supply, by a self-contained fluid motor conveniently housed within the shear handle.

Yet another important purpose of the invention consists in arranging a novel and highly advantageous driving connection between the fluid motor and the jaw operating means of the shear.

Still another important object of the invention includes the arrangement of a portable power shear having a novel and efficient control means for the fluid motor thereof.

A still further important purpose of the invention resides in the provision of an improved fluid pressure operated mechanism for actuating the jaws of a shear, wherein there is provided a mechanical advantage between the operating means and the shears.

An important feature of the invention is the provision of telescopic operating and operated pistons housed within a fluid pressure chamber within the handle of the shears, for operating the jaws of the shears in an improved and highly satisfactory manner.

A final important purpose of the invention to be specifically enumerated herein, resides in the provision of a compact and conveniently handled apparatus of the character described, wherein the control means for actuating the mechanism of the shears is disposed for convenient manipulation in the handle grip portion of the device.

These, together with various ancillary objects of the invention which will later become apparent as the following description proceeds, are attained by this device, a preferred embodiment of which has been illustrated by way of example only in the accompanying drawings, wherein:

Figure 1 is a side elevational view of the pruning shears constructed in accordance with the principles of this invention;

Figure 2 is a side elevational view similar to Figure 1, with certain parts being broken away to show the interior construction of the device.

Figure 3 is an enlarged fragmentary vertical sectional view, parts being shown in elevation, of a part of the fluid pressure operating means; and, Figure 4 is a view similar to Figure 3 but showing the rest of the fluid pressure operating means of the device.

Referring now more specifically to the accompanying drawings, wherein like numerals designate similar parts throughout the various views, the numeral 10 designates a tubular or sleeve-like member of any suitable material which constitutes the shaft of the shears and which may be of any desired length according to the use to which the shears is to be put. Rigidly attached, as by welding, and by a fastening bolt for a split sleeve construction 16, is the fixed jaw 18 of the shears, carried by the outer extremity of the shaft 10.

A movable jaw 20 is pivoted to the fixed jaw 18 as by a pair of connecting links 22 and 24, whereby the cutting blades 26 and 28 respectively of the movable and fixed jaws have relatively pivotal and sliding motion with respect to each other whereby upon actuation of the movable blade, by a mechanism to be subsequently described, the shear jaws effect a slicing and cutting stroke as will be readily understood.

Pivotally connected as at 30 to a rearwardly extending portion 32 of the movable jaw 20, is an actuating rod 34 which extends into the hollow shaft 10 and at its rear end is pivoted as at 36 to the rod 38 of an actuated piston 40.

As shown more clearly in Figures 2, 3 and 4, the actuated piston 40 of any suitable construction is reciprocably received in a fluid pressure operating cylinder 42 which is provided at its outer extremity with a screw-threaded closure plate 44 provided with an axial bore 46 for a slidably and guidingly receiving the piston rod 38 rigidly carried by the piston 40, and which is further engaged as by fastening bolts 48, whereby the inner end of the shaft 10 is rigidly but demountably attached thereto.

Suitable packing means 50 are provided in the bore 46, as shown in Figure 4, for establishing a fluid-tight seal between the cover member 44 and the piston rod 38 sliding therethrough. This piston rod has its inner end screw-threadedly engaged as at 52 with the outer end of the actuated piston 40, which interior is provided with the customary sealing or packing rings 54 retained as by a packing gland 56 adjustably secured upon the screw-threaded end 58 of a diametrically reduced portion of the piston 40. A fluid pressure chamber 60 is formed between the cover plate 44 and the piston 40, for a purpose to be later described. A closure plug 62 screw-threadedly engages the cover 44 to give access to the chamber 60 for the purpose of supplying lubricant thereto or otherwise servicing the chamber as desired.

Integrally formed upon the inner surface of the piston 40, is an axially extending tubular sleeve 64 whose interior cavity 66 constitutes a fluid pressure operating chamber in a manner to be set forth hereinafter.

As shown best in Figure 3, the other end of the fluid pressure cylinder 42 is provided with a removable cover plate 68, and an operating piston 70 provided with the customary packing or sealing means 72 retained by a packing gland 74, is slidably received in the shaft 42 in opposition to the operated piston 40. An operating chamber 76 is formed between the rear cover plate 68 and the operating piston 70, and the operating piston is further provided with an axial forwardly extending tubular sleeve 78 closed at its outer end to provide a piston 80, as shown in Figure 4, this piston being receivable and slidable within the chamber 66 of the sleeve 64. As clearly shown in Figure 4 at 82, a fluid pressure sealing or packing means is provided in an internal groove in the bore 66 of the extension 64, to establish a fluid-tight seal between the sleeve 64 constituting a fluid pressure chamber and the operating piston 80.

A compression spring 84 encircles the two axial extensions 64 and 78, and yieldingly urges the two pistons 40 and 70 towards the opposite ends of the fluid pressure cylinder 42.

A plurality of ports or passages means 86 extend through the piston 40 to connect the chambers 66 and 60 in free and open communication with each other. Preferably, a suitable fluid operating means is contained within the chambers 60, 66, and the passages 86, to form an operating means, this fluid being of any suitable type, such as an oil or hydraulic fluid.

Preferably integrally formed with the rear cover plate 68 of the fluid pressure cylinder 42, is a handle portion 88 of any suitable shape, having an opening 90 conveniently contoured to receive the hand of the operator by means of which the implement may be grasped and manipulated. At any convenient point, the handle is provided with a tubular hollow boss 92 through which extends a flexible conduit 94 by means of which any suitable fluid pressure, such as compressed air, may be led from any suitable fluid pressure source, such as a pump, not shown, and conducted into the chamber 76 under the control of a valve means to be now described.

A tubular bore 96 extends transversely of the handle member 88 adjacent the junction thereof with the fluid pressure cylinder 42, and the cover plate 68 thereof. A tubular or sleeve-like casing member 98 is inserted in the bore 96, and retained therein by engagement of its screw-threaded extremities with an elbow fitting 100 to which is connected the fluid pressure conduit 94, by means of a nipple or coupling 102, and a retaining nut 104. This sleeve-like member 98 constitutes a valve assembly to be now described. Intermediate its ends, the sleeve 98 is provided with a partition 106 in which is slidably received the stem 108 of a valve 110, which is biased upwardly against the partition 106 as by a spring 112, into normally closed position against its port or seat.

On the other side of the partition 106, is provided a bore 114 extending to the end of the sleeve member, in which is slidably received a valve operating cylinder 116 which constitutes a valve as will be set forth hereinafter, and is provided on its inward end with an axial extension 118 which upon inward movement of the member 116 is adapted to engage the stem 108, and open the valve 110 against the closing bias of the spring 112.

At its outer end, the member 116 is provided with a reduced extension 120 extending through an aperture in the nut 104, and which is surrounded by a spring 122 which with the aid of a washer 124 suitably attached to the extremity of the portion 120, yieldingly urges the member 116 to its outward position in the bore 114. An operating lever having a single grip portion 126 shaped to fit the fingers of the hand of the operator, is pivoted to the handle portion 88 as at 128, and is provided with an operating end 130 engageable with the extremity of the portion 120.

As shown by the dotted line construction of Figure 3, the handle portion 88 and its aperture or slot portion 90 thereof is provided with a channel or groove 132 which is adapted to receive the end of the finger grip portion 126, when the latter is pivoted about its axis 128 by the fingers of the operator.

As shown best in Figure 3, the chamber 76 is connected by a pair of ports or passages 134 and 136 respectively which extend through the closure plate 68 and intersect the transverse passage or bore 96. The sleeve member 98 is provided with longitudinally spaced sets of bores or ports 138, 140 and 142 which extend from the hollow interior of the sleeve member on both sides of the partition 106, and through the walls thereof into selective engagement with the ports 134 and 136.

The operation of the device is as follows:

When the device is inoperative, the parts of the control mechanism are in the position shown in Figures 3 and 4. The valve 110 is closed against its seat by the spring 112, thereby cutting off communication between the fluid pressure conduit 94 and the operating chamber 76. At the same time, the plunger 116 is in its outward position by reason of the bias of the spring 122, whereby the chamber 76 is in free communication by means of the passage 134, and port 138 with the chamber bore 114 within the sleeve valve member, which latter is vented to the atmosphere by means of the port 140 through a suitable passage in the handle 88, not shown. The spring 84 has urged the pistons 70 and 40 to their extreme opposite ends of the cylinder, and the piston 80 is in its extreme outward stroke or position with reference to the chamber 66.

When now, the operator depresses the finger grip portion 126 of the control lever, the end 130 thereof now biases the member 120 inwardly of its bore against the opposition of spring 122, whereby the body portion 116 first covers the port 138, thereby breaking the free communication of the chamber 76 with the atmosphere.

Further inward movement of the member 116, causes its extension 118 to engage the stem 108 and urge the valve 110 from its seating engagement against the closing bias of the spring 112. Consequently, at this time, the fluid pressure from the conduit 94 may now pass the valve 110, may enter the passage 142 and by means of the port 136 enter the operating chamber 76. Since the latter is cut off from communication with the atmosphere through the port 134 by means of the overrunning of this port by the solid portion 116, as above set forth, this fluid pressure drives the operating piston 70 inwardly against the opposition of spring 84. Consequently, the piston 80 carried thereby is moved inwardly of the cylinder 66 carried by the actuated piston 40.

This inward movement of piston 80, displaces hydraulic fluid such as oil from the cylinder 66 through the passage 86 into the chamber 60, and by reason of the difference in piston areas of piston 80 and piston 40, the latter is urged rearwardly from the chamber 60 against the opposition of the spring 84.

It will thus be noted that the larger area of the operating piston 70 exposed to the fluid pressure in chamber 76, produces a great force applied to the sleeve 78, and consequently, a very high pressure applied to the area of the piston 80. This latter high pressure is applied to the much greater area of the piston 40 in the chamber 60, and by reason of this greater area produces a very greatly increased force, representing a mechanical advantage, with a reduced piston travel relative to the pressure and movement of the operating piston 70. Accordingly, the piston rod 38 is moved at a great mechanical advantage relative to the operating piston 70, to actuate the connecting rod 34 and cause a sliding and pivotal movement of the pivotal jaw 20 upon the fixed jaw 18 and thereby operate the shears.

Upon release of the finger grip portion 126, the spring 122 returns the finger grip lever to its inoperative or idle position, withdrawing the plunger 116. The withdrawal of the plunger 116 and its extension 118 thereby permits the closing of the valve 110 by the spring 122 augmented by the pressure of the air or fluid in the conduit 94. When the valve 110 is closed, the chamber 76 is no longer subjected to the pressure of the fluid conduit 94, and further retracting movement of the member 116 causes the latter to now uncover the ports 138 and 134, whereby the pressure in the chamber 76 is vented to the atmosphere through the ports 140 as above mentioned.

The spring 84 is therefore free to return the two pistons 70 and 40 to their idle or rest positions, thereby causing the retraction of the piston 80 in the cylinder 66, and expelling hydraulic fluid from the chamber 60 through the passage 86 into the cylinder 66.

From the foregoing, the manner of operating and constructing the device will be readily understood and further explanation is believed to be unnecessary.

Since numerous modifications will readily appear to those skilled in the art, it is not intended to limit the invention to the exact construction shown and described, but all suitable modifications and equivalents may be resorted to falling withing the scope of the appended claims.

Having described the invention what is claimed as new is:

1. Power operated shears including a shaft having a fixed blade mounted thereon, a movable blade secured to said fixed blade for pivotal and sliding movement relative thereto, operating means in said shaft, means operatively connecting said operating means and said movable blade, a source of fluid pressure, communicating with said operating means and a control valve in said source of fluid pressure, said operating means including an actuated piston attached to said connecting means, an operating piston subject to said source of fluid pressure and fluid pressure driving means for causing movement of said actuated piston in response to movement of said operating piston, said driving means including an actuator piston on said operating piston and fluid passage means communicating with said actuator piston and said actuated piston.

2. Power operated shears including a shaft having a fixed blade mounted thereon, a movable blade secured to said fixed blade for pivotal and sliding movement, fluid pressure actuated operating means in said shaft, means operatively connecting said operating means and said movable blade, a source of fluid pressure communicating with said operating means and a control valve in said source of fluid pressure, said operating means comprising a cylinder in said shaft, actuated and operating pistons in opposite ends of said cylinder, an operator piston on said operated piston, an operator cylinder for said operator piston and fluid passage means connecting said operator cylinder and said actuated piston.

3. The combination of claim 2 wherein said operator and actuated pistons are of different areas to provide a mechanical advantage, and are coaxial.

4. Power operated shears including a shaft having a fixed blade mounted thereon, a movable blade secured to said fixed blade for pivotal and sliding movement, fluid pressure actuated operating means in said shaft, means operatively connecting said operating means and said movable blade, a source of fluid pressure communicating with said operating means and a control valve in said source of fluid pressure, said operating means comprising a cylinder, a first piston reciprocable in said cylinder and subjected to a source of fluid pressure, an actuated piston reciprocable in said cylinder, said actuated piston being attached to said connecting means, a hydraulic system opertaively connecting said first piston and said actuated piston, and spring means urging said first and actuated pistons towards their inoperative positions.

5. The combination of claim 4 wherein said hydraulic cylinder includes a second piston carried by said first piston and a second cylinder carried by said actuated piston, said second cylinder being reciprocable in said second piston.

6. The combination of claim 5 wherein said actuated piston has passages communicating with said second cylinder and the other side of said actuated piston.

7. Power operated shears comprising a shaft, relatively movable blades including a stationary blade mounted on said shaft and a movable blade, a cylinder, a fluid pressure operated piston within said cylinder, connecting means operatively connecting said piston to the movable blade for actuation of the latter by fluid pressure, said cylinder having a cylinder head with a handle thereon, a chamber extending through said head, a valve assembly in said chamber, a fluid pressure conduit communicating with said valve assembly, intake and exhaust passages connecting the interior of said cylinder with the valve assembly, a vent connecting said exhaust passage to the atmosphere, and operating means for said valve assembly, said operating means causing said valve assembly to close said exhaust passage when said intake passage is opened.

8. The combination of claim 7 wherein said operating means includes a trigger lever pivoted to said handle, said lever being operatively connected with said valve assembly.

9. The combination of claim 7 wherein said chamber consists of a cylindrical bore in said head transversely thereof.

10. The combination of claim 7 wherein said chamber consists of a cylindrical bore in said head transversely thereof, said valve assembly comprising a cylindrical casing received in said bore, ports in said casing communicating with said passages and vents and pressure sealing rings on said casing seating in the wall of said bore.

11. A hydraulic actuating means for portable power shears comprising a hydraulic cylinder, actuated and operating pistons in opposite ends of said cylinder, an actuating piston on said operating piston, an actuating cylinder on said actuated piston receiving said actuating piston, and conduit means extending through said actuated piston.

12. The combination of claim 11, including spring means in said hydraulic cylinder engaging said actuated and operating pistons and yieldingly urging them apart.

13. The combination of claim 11, including spring means in said hydraulic cylinder engaging said actuated and operating pistons and yieldingly urging them apart, said spring means surrounding said actuating piston and said actuating cylinder.

JOSEPH CARNESECCA, JR.

REFERENCES CITED

The following references are of record in the file of this patent:

UNITED STATES PATENTS

| Number | Name | Date |
|---|---|---|
| 1,940,304 | Jackson | Dec. 19, 1933 |
| 2,075,341 | Goodman | Mar. 30, 1937 |
| 2,257,245 | Rudolph | Sept. 30, 1941 |
| 2,262,645 | Newman | Nov. 11, 1941 |
| 2,366,909 | Johnson | Jan. 9, 1945 |
| 2,391,676 | Browning | Dec. 25, 1945 |
| 2,488,224 | Mothorn | Nov. 15, 1949 |
| 2,505,385 | Carnesecca | Apr. 25, 1950 |